M. A. MARQUETTE.
PROCESS FOR MAKING STRAND FABRIC.
APPLICATION FILED JAN. 23, 1919.

1,321,223.

Patented Nov. 11, 1919.
2 SHEETS—SHEET 1.

INVENTOR.
Melvin A. Marquette
BY Chapin & Neal
ATTORNEYS.

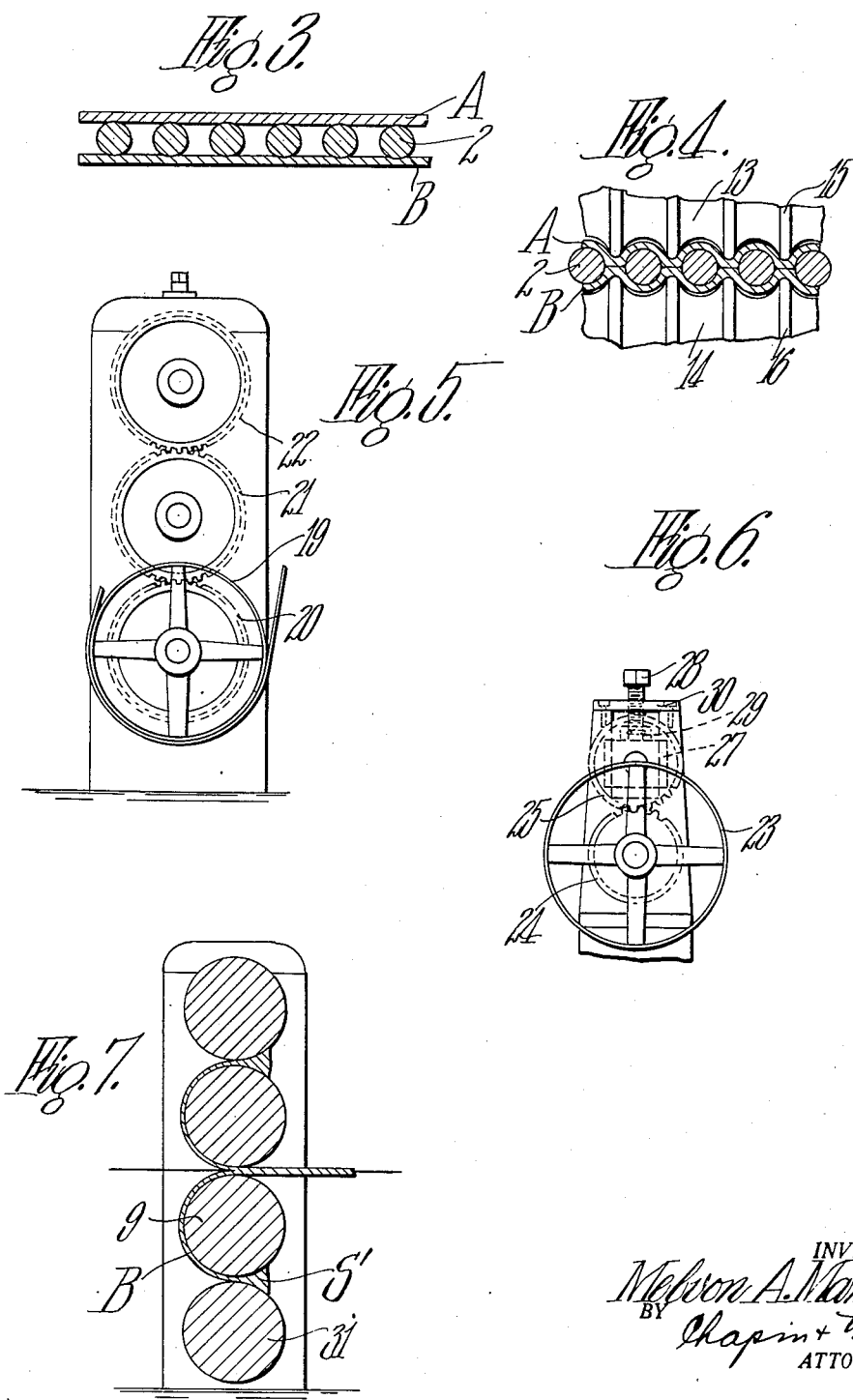

UNITED STATES PATENT OFFICE.

MELVON A. MARQUETTE, OF SPRINGFIELD, MASSACHUSETTS, ASSIGNOR TO THE FISK RUBBER COMPANY, OF CHICOPEE FALLS, MASSACHUSETTS, A CORPORATION OF MASSACHUSETTS.

PROCESS FOR MAKING STRAND FABRIC.

1,321,223. Specification of Letters Patent. Patented Nov. 11, 1919.

Application filed January 29, 1919. Serial No. 273,872.

*To all whom it may concern:*

Be it known that I, MELVON A. MARQUETTE, a citizen of the United States of America, residing at Springfield, in the county of Hampden and State of Massachusetts, have invented certain new and useful Improvements in Processes for Making Strand Fabric, of which the following is a specification.

My invention relates to the covering of strands, and more particularly to the making of strand fabric, such "fabric" consisting preferably of parallel strands, generally cords, extending longitudinally of the fabric in somewhat spaced relation and held together and covered all about with tacky unvulcanized, and somewhat plastic rubber.

As is well understood in the tire building art, tire casings, popularly called "tires", of the cord type are built up either from layers of single cords or from layers of cord fabric. In either case, it is highly desirable that each cord should be fully covered with rubber, in order that the cords shall not chafe against each other when the tire flexes in use.

Various methods have heretofore been devised for the proper covering of the cords, and for the production of cord fabric. But certain of these processes were slow, while other and more rapid ones entailed the subjecting of the cords to pressure, distortion, strain, and breaking of the fibers. Of this latter class were those processes which included the passing of the cords and the rubber stock between calender rolls, while causing sufficient pressure between the rolls to work the stock down between the cords, and stick it to the cords. The difficulty was that the high pressure, applied over the whole width of the sheet, not only acted on the rubber but, unfortunately, acted also to flatten, distort, and disrupt the cords, and cords so abused, resulted in a fabric, whose cords were of inferior quality and wearing properties. Yet this calender method had the very real advantages of rapid and continuous production of sheets of indefinite length, performance by simple and easily procured machines, and simple technique.

By my process I retain the various advantages of the calender process, while eliminating the disadvantages of flattening and disrupting the cords. Briefly, I do this by first just merely lightly attaching the rubber sheets to the bank of cords, one on each side, making no attempt to drive the rubber between the cords or embed the cords in the rubber, except for a very slight and harmless "attaching embedment"; and then, as a separate step, I force the two sheets together between the cords, stick the sheets together, and wrap the rubber about the cords, in such a way that the cords are substantially not subjected to pressure. Thus, I produce cords fully covered with rubber and yet cords which have never been subjected to any deleterious crushing action.

One object of my invention is to provide a process for the rapid production of covered strands by the calender method without crushing or distorting the strands.

Another object of my invention is to provide a process for the rapid production of strand fabric by the calender method, without crushing or distorting the strands.

To these ends, and also to improve generally upon processes of the character indicated, my invention consists in the following matters hereinafter described and claimed.

The more clearly to describe my process I first describe briefly an apparatus with the aid of which the same may be performed, illustrating such apparatus in the accompanying drawings, in which:—

Fig. 3 is a somewhat diagrammatic cross section of the partially made fabric upon emergence from the calender machine;

Fig. 4 is a somewhat diagrammatic cross section of the fabric being completed and showing the action of the assembling rollers;

Fig. 5 is a side elevation of the calender machine; and

Fig. 6 is a side elevation of the machine for pinching the covering layers together, with the base broken away, and Fig. 7 is a conventional cross section of a four-roll calender machine that may be used if desired.

Figure 1:
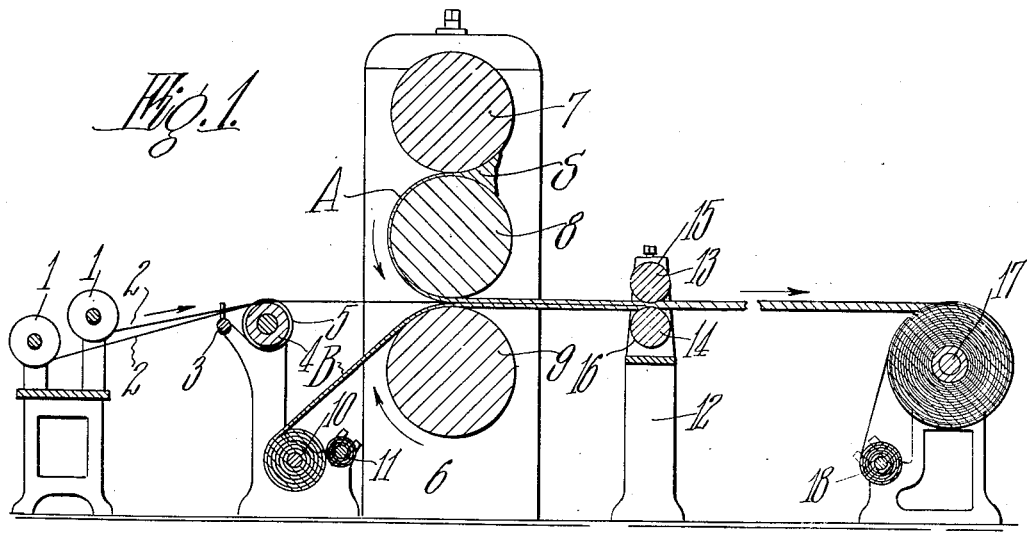
Figure 1 is a somewhat diagrammatic conventional longitudinal sectional view of an apparatus for practising my process.
Figure 2:
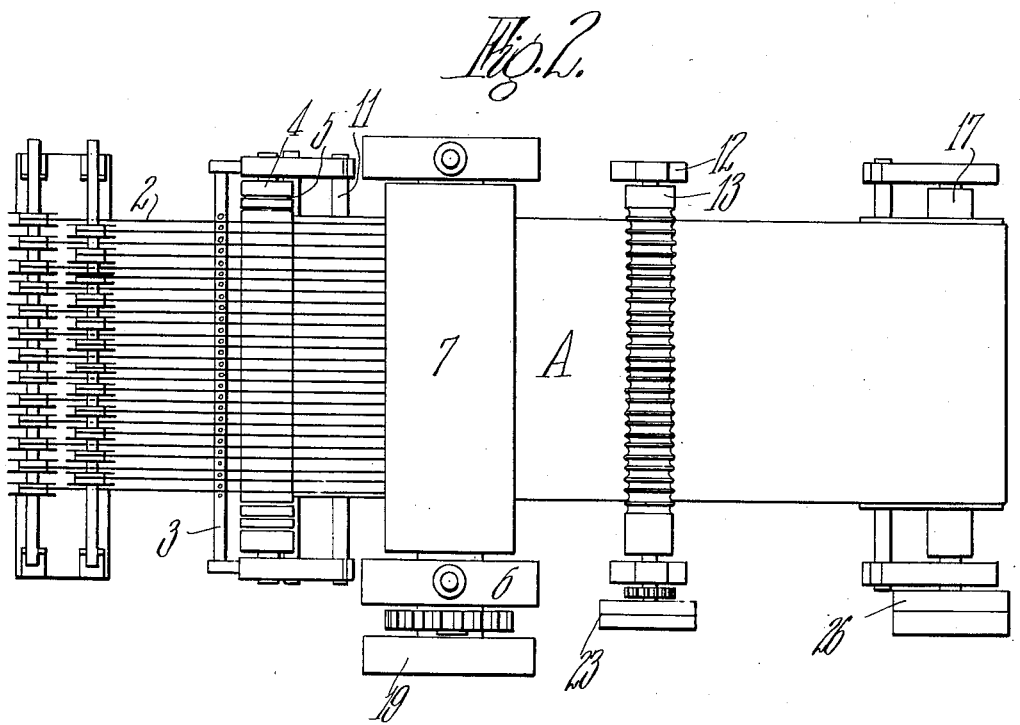
Fig. 2 is a plan view of the apparatus illustrated in Fig. 1.

Referring to the drawings, and proceeding from left to right in Figs. 1 and 2:—

A series of bobbins 1 supply the strands 2, generally cords. An aliner, as the comb 3, is located to receive the strands 2 from the bobbins 1, and a roller 4, with grooves 5 each to receive a strand 2, is preferably provided to receive the strands from comb 3. A calender machine designated generally as 6, presents three rollers, 7, 8, and 9. Between the rollers 7 and 8 rubber stock S is rolled into a sheet A which is carried by the roller 8 between the rollers 8 and 9. A drum 10 supplies another sheet of stock B to lie upon the roller 9 between the rollers 8 and 9, the liner of such stock being wound off on the drum 11.

The rollers 8 and 9 are so spaced with respect to each other, and the space therebetween so proportioned to the thicknesses of the sheets A and B and the diameter of the strands—in the same fabric all strands, will, of course, have substantially the same diameter—that for all practical purposes no pressure will be exerted on the strands.

Beyond the calender machine, in position to receive the partially formed fabric therefrom, is an assembling machine, designated generally as 12, comprising a pair of web-pinching rollers 13 and 14. And these rollers are fluted to present each a series of projecting circumferential flanges 15 and 16 respectively, for insertion between the respective strands.

The flanges 15 and 16 are of such relative height above the relief surface therebetween, and are so proportioned with relation to the thickness of the sheets A and B, and the diameter of the strands, and the rollers so spaced with respect to each other, that the sheets can be brought together, and stuck together, between the strands, and the sheets can be wrapped around and stuck to the strands, without the rubber or rollers exerting any appreciable pressure on the strands, the pull of the sheets about the strands, as the sheets are forced together, being sufficient to adequately stick the sheets to the strands, but yet entirely insufficient to harm or abuse the strands.

Beyond the assembling machine is a drum 17 for the completed fabric, liner being supplied from the drum 18.

With the above described apparatus, then, my process is performed as follows:—The strands and sheets A and B, are passed between the rollers 8 and 9, where the step of placing a sheet on each side of the bank of strands, and lightly sticking it thereto is performed, the step being essentially a laying on, as distinguished from a working in, such slight embedment as may take place being more particularly due to the plastic nature of the unvulcanized material, and not to the use of any material pressure between the rollers.

After the performance of the step aforesaid the second step is performed at the assembling machine. Here the two layers are brought together, and stuck to each other and all about the strands, without the application of any direct pressure to the strands, and by a means inserted between, and exerting the pressure between, the strands, as distinguished from a means, as a smooth roller, acting over the whole surface of the sheets, and pressing drectly on the rubber immediately above and below the cords, to knead the rubber, and crowd it from above and below the strands, down between them.

Thus, the completed fabric has been formed, with each strand fully covered with rubber stock adhering thereto. And yet, the strands have not been subjected to any pressure which might disrupt, flatten or crush them. And, hence, the fabric is of ideal quality with its strands uncrushed and undistorted.

In Fig. 4 I have shown the relief surfaces between the flanges clear of the webs, to emphasize the feature of no roller pressure on the strands. But, it will be understood, that an actual separation between the relief surfaces and the web is not necessary, provided no material pressure is exerted therebetween.

As to the details of the apparatus:—The rollers of the calender machine are positively driven, preferably at equal surface speeds in any suitable manner, as by the pulley 19, driving the roller 9, and the gears 20, 21 and 22, communicating the motion to the rollers 8 and 7. Suitable means, similar to those common to calender machines, and therefore not shown, are desirably provided for adjusting the distances between the three rollers as desired. The liner drum 11 is desirably driven by being maintained in frictional contact with the stock on the drum 10, as is well understod in the art. The rollers 13, and 14 are suitably positively driven, preferably at equal speeds, as by the pulley 23, driving the roller 14, and the gears 24 and 25 communicating the motion to the roller 13. The drum 17 is positively driven by the pulley 26, at decreasing R. P. M. as the diameter of the wound fabric increases to properly wind the fabric but not to strain it.

Suitable means for adjusting the roller 13 toward the roller 14 to regulate the relative closeness of the tops of flanges 15 and 16, are preferably provided. For example, there is shown (Fig. 6, and duplicated, of course, at each side of the machine) a journal block 27 for the roller 13, vertically slidable in the machine frame, and receiving a screw 28 rotatably socketed therein at 29, the screw being screwed through the top plate 30 of the machine. Thus, by turning the screw 28 the block 27, and roller 13 can be raised and lowered as desired.

Preferably, of course, in operation the surface speeds of the rollers 8 and 9 and of the rollers 13 and 14 are made all the same in order to give the fabric a smooth travel, without stretching or slacking of the fabric.

If desired (Fig. 7) a four-roller calender machine may be used, instead of the three-roller one previously described, and the sheet B rolled out from stock S' between the rollers 9 and 31, such driving and adjusting means, for adjusting surface speed of the rollers, and adjustment of the distance between the rollers, being provided, as desired and as is common in calender machines.

Although I have described my process thus far as for the production of a strand fabric or strip comprising a series of strands, as, at present, this seems to me, its most desirable field of use, it will be understood that it is applicable to the production of a strip or "fabric" comprising but a single strand—a covered strand being thereby produced—and such an application I consider within my invention.

It will be seen that I have provided a process for the rapid, simple, and inexpensive production of strand fabric by the roller method, not involving the crushing or distorting of the strands.

Having thus described my invention what I claim as new and desire to secure by Letters Patent is:—

1. The process of making a strand fabric from a strand and covering webs therefor, which consists in applying a covering web to opposite sides of the strand, with a pressure insufficient to substantially force the webs about the remaining sides of the strand, and then forcing the webs into adhering relation to such remaining sides of the strand and to each other by pressure applied only to the webs and not to the strands; substantially as described.

2. The process of making strand fabric from a series of strands and covering webs for the strands, which consists in applying a covering web to each side of the series of strands, while said strands are in spaced relation, with a pressure insufficient to substantially force the webs between the strands, and then forcing the webs between the strands into adhering relation to the strands and to each other, by pressure applied only between the strands, substantially as described.

3. The process of making strand fabric from a series of strands and covering webs for the strands, which consists in laying a covering web on each side of the series of strands, while said strands are in spaced relation, and then forcing the webs between the strands into adhering relation to the strands and to each other, by pressure applied only between the strands; substantially as described.

4. The process of making strand fabric from a series of strands and covering webs for the strands, which consists in passing a series of strands, in spaced relation, between rollers and at the same time supplying covering webs to said strands and between said rollers, with said rollers spaced sufficiently to insure that said webs are not substantially forced between strands, and then passing the strands and webs between rollers having flanges and relief surfaces between the flanges, inserting the flanges between the strands to force the webs between the strands into adhering relation to the strands and to each other, while utilizing the relief surfaces to insure that the strands shall be subjected to no direct pressure from the rollers; substantially as described.

MELVON A. MARQUETTE.